(12) United States Patent
Tseng et al.

(10) Patent No.: US 11,010,886 B2
(45) Date of Patent: May 18, 2021

(54) SYSTEMS AND METHODS FOR AUTOMATIC CORRECTION OF DRIFT BETWEEN INSPECTION AND DESIGN FOR MASSIVE PATTERN SEARCHING

(71) Applicant: KLA-Tencor Corporation, Milpitas, CA (US)

(72) Inventors: Chi-Yuan Tseng, Hsinchu (TW); Ming-Hsiang Hsueh, Zhubei (TW)

(73) Assignee: KLA-Tencor Corporation, Milpitas, CA (US)

( * ) Notice: Subject to any disclaimer, the term of this patent is extended or adjusted under 35 U.S.C. 154(b) by 284 days.

(21) Appl. No.: 15/594,300

(22) Filed: May 12, 2017

(65) Prior Publication Data

US 2017/0337673 A1 Nov. 23, 2017

Related U.S. Application Data (60) Provisional application No. 62/337,618, filed on May 17, 2016.

(51) Int. Cl.
| | | |
|---|---|---|
| *G01N 21/956* | (2006.01) | |
| *G06T 7/00* | (2017.01) | |
| *G06T 7/73* | (2017.01) | |

(52) U.S. Cl.
CPC .......... *G06T 7/001* (2013.01); *G06T 7/74* (2017.01); *G06T 2207/30148* (2013.01)

(58) Field of Classification Search
CPC . G06T 7/001; G06T 7/74; G06T 2207/30148; G06T 7/0006; G06T 2207/10061; G06T 7/0002; H01J 2237/2817; H01J 2237/24592; G01N 21/9501; G01N 21/956; G01N 2223/418; G01N 21/55; G01N 21/95607; G01N 2021/95676; G01N 2021/8861; H01L 21/66
See application file for complete search history.

(56) References Cited

U.S. PATENT DOCUMENTS

| | | |
|---|---|---|
| 7,343,583 B2 | 3/2008 | Keck et al. |
| 7,904,845 B2 | 3/2011 | Fouquet et al. |
| (Continued) | | |

FOREIGN PATENT DOCUMENTS

| | | | | |
|---|---|---|---|---|
| JP | 2014139537 A | * | 7/2014 | |
| JP | 6312642 B2 | * | 4/2018 | ......... G01N 21/9501 |
| (Continued) | | | | |

OTHER PUBLICATIONS

ISA/KR, International Search Report for PCT/US2017/032975 dated Aug. 24, 2017.

(Continued)

*Primary Examiner* — Patrick E Demosky
(74) *Attorney, Agent, or Firm* — Hodgson Russ LLP (57) ABSTRACT

Systems and methods for automatic correction of drift between inspection and design for massive pattern searching are disclosed herein. Defects are identified in a scan of a wafer. The defects are associated with tool coordinates. An SEM review tool captures centered images of the defects. The SEM review tool is aligned with the wafer using design polygons in an imported design file. Design coordinates are exported and used to define patterns of interest and identifying locations of those patterns of interest.

17 Claims, 4 Drawing Sheets

(56) References Cited

U.S. PATENT DOCUMENTS

| | | | |
|---|---|---|---|
| 8,041,103 B2 | 10/2011 | Kulkarni et al. | |
| 8,054,097 B2 | 11/2011 | Lin et al. | |
| 9,098,891 B2 | 8/2015 | Kulkarni et al. | |
| 9,251,581 B1 | 2/2016 | Chen et al. | |
| 2003/0139838 A1* | 7/2003 | Marella | G01N 21/55 700/110 |
| 2007/0288219 A1* | 12/2007 | Zafar | G03F 1/84 703/14 |
| 2010/0188657 A1 | 7/2010 | Chen et al. | |
| 2013/0279790 A1 | 10/2013 | Kaizerman et al. | |
| 2014/0198975 A1 | 7/2014 | Nakagaki et al. | |
| 2015/0125065 A1* | 5/2015 | Lee | G06T 5/00 382/149 |
| 2016/0027165 A1 | 1/2016 | Wu et al. | |
| 2016/0085905 A1 | 3/2016 | Chen et al. | |
| 2016/0300338 A1* | 10/2016 | Zafar | G06T 7/001 |

FOREIGN PATENT DOCUMENTS

| | | |
|---|---|---|
| TW | I503538 B | 10/2015 |
| TW | I519801 B | 2/2016 |
| WO | 2006039760 A1 | 4/2006 |

OTHER PUBLICATIONS

TIPO, Office Action for TW Application No. 106116259, dated Nov. 26, 2020 (see X/Y/A designations at p. 7).

* cited by examiner

SYSTEMS AND METHODS FOR AUTOMATIC CORRECTION OF DRIFT BETWEEN INSPECTION AND DESIGN FOR MASSIVE PATTERN SEARCHING

CROSS-REFERENCE TO RELATED APPLICATIONS

This application claims priority to U.S. Provisional Application No. 62/337,618, filed on May 17, 2016, the disclosure of which is incorporated herein by reference.

FIELD OF THE DISCLOSURE

The present disclosure relates to defect detection, namely, systems and methods for automatic correction of drift between inspection and design for massive pattern searching.

BACKGROUND OF THE DISCLOSURE

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically. Therefore, more and more defects may be detected on the wafers, and correcting the processes to eliminate all of the defects may be difficult and expensive. As such, determining which of the defects actually have an effect on the electrical parameters of the devices and the yield may allow process control methods to be focused on those defects while largely ignoring others. Furthermore, at smaller design rules, process induced failures may, in some cases, tend to be systematic. That is, process induced failures tend to fail at predetermined design patterns often repeated many times within the design Elimination of spatially systematic, electrically relevant defects is important because eliminating such defects can have a significant overall impact on yield. Whether or not defects will affect device parameters and yield often cannot be determined from the inspection, review, and analysis processes described above since these processes may not be able to determine the position of the defect with respect to the electrical design.

Hardware and software tools exist to locate errors or areas of interest in a design file or in an image of a wafer. However, due to limitations in the imaging hardware, the resolution of an image may be insufficient to accurately identify the relocation of an error or area of interest. For example, because of how the images are composed, the perceived error or area of interest may not be in the actual location of the error or area of interest. Thus, a discrepancy may exist between the design file (which has exact actual locations) and the image of the wafer.

BRIEF SUMMARY OF THE DISCLOSURE

One embodiment of the present disclosure may be described as a method for identifying pattern of interest locations in a design file. The method comprises performing a scan of a wafer using an image data acquisition subsystem. The image data acquisition subsystem may be a broadband plasma image data acquisition subsystem.

The method further comprises identifying one or more defects in the scan of the wafer using the image data acquisition subsystem. Each identified defect is associated with a tool coordinate.

The method further comprises importing a design file corresponding to the wafer using a processor in electronic communication with a Scanning Electron Microscope (SEM) review tool. The design file has one or more design polygons.

For each defect identified in the scan of the wafer, the method further comprises centering a field of view of the SEM review tool at the tool coordinate associated with the defect and capturing an image at the centered field of view. The image is captured using the SEM review tool and the field of view is centered using the processor. The field of view of the SEM review tool is at least 300 nm.

The method further comprises confirming the one or more defects in the scan using the SEM review tool. The confirmation is performed based on the captured images. The one or more defects in the scan may be confirmed using automatic defect classification.

The method further comprises aligning the SEM review tool with the wafer using the processor. The alignment is performed based on the one or more design polygons in the design file.

The method further comprises exporting a design coordinate file from the SEM review tool. The design coordinate file has design coordinates associated with each of the confirmed defects. The design coordinates are based on the aligned SEM review tool and wafer. The design coordinate file may be a CSV file.

The method further comprises defining one or more patterns of interest using the processor. The patterns of interest are based on the design coordinates in the design file and the confirmed one or more defects.

The method further comprises identifying a pattern of interest location in the design file for each of the one or more defined patterns of interest. The patterns of interest are identified using the processor.

In one embodiment, the method may further comprise performing a second scan of the wafer at the identified pattern of interest locations using the image data acquisition subsystem. In another embodiment, the method may further comprise performing design rule checking on the imported design file using the processor.

Another embodiment of the present disclosure may be described as a system for identifying pattern of interest locations in a design file. The system comprises an image data acquisition subsystem, a SEM review tool, and a processor. The SEM review tool has a field of view, for example, the field of view of the SEM review tool is at least 300 nm. The processor is in electronic communication with the image data acquisition subsystem and the SEM review tool. The image data acquisition subsystem may be a broadband plasma image data acquisition subsystem.

The processor is configured to instruct the image data acquisition subsystem to perform a scan of a wafer. The processor is further configured to identify one or more defects present in the scan. Each defect is associated with a tool coordinate.

The processor is further configured to import a design file corresponding to the wafer. The design file has one or more design polygons. In one embodiment, the processor is further configured to perform design rule checking on the imported design file.

The processor is further configured, for each defect identified in the scan of the wafer to: instruct the SEM review tool to center the field of view at the tool coordinate associated with the defect and instruct the SEM review tool to capture an image at the centered field of view.

The processor is further configured to instruct the SEM review tool to confirm the one or more defects in the scan based on the captured images.

The processor is further configured to align the SEM review tool with the wafer based on the one or more design polygons in the design file.

The processor is further configured to export a design coordinate file from the SEM review tool. The design coordinate file has design coordinates associated with each of the confirmed defects. The design coordinates are based on the aligned SEM review tool and wafer. The design coordinate file may be a CSV file.

The processor is further configured to define one or more patterns of interest. The processor defines the patterns of interest based on the design coordinates in the design file and the confirmed one or more defects.

The processor is further configured to identify a pattern of interest location in the design file for each of the one or more defined patterns of interest. In one embodiment, the processor is further configured to instruct the image data acquisition subsystem to perform a second scan of the wafer at the identified pattern of interest locations. In another embodiment, the processor is further configured to perform automatic defect classification.

One embodiment of the present disclosure may be described as a non-transitory computer readable medium storing program configured to instruct a processor to perform a scan of a wafer, using an image data acquisition subsystem. The program also instructs the processor to identify one or more defects in the scan of the wafer, using the image data acquisition subsystem. Each defect is associated with a tool coordinate. The program also instructs the processor to import a design file corresponding to the wafer, using a processor in electronic communication with a SEM review tool. The design file has one or more design polygons.

For each defect identified in the scan of the wafer, the program is configured to instruct the processor to center a field of view of the SEM review tool at the tool coordinate associated with the defect and capture an image at the centered field of view, using the SEM review tool.

The program is also configured to instruct the processor to confirm the one or more defects in the scan based on the captured images using the SEM review tool. The program is also configured to instruct the processor to align the SEM review tool with the wafer based on the one or more design polygons in the design file. The program is also configured to instruct the processor to export a design coordinate file from the SEM review tool a design coordinate file. The design coordinate files has design coordinates associated with each of the confirmed defects. The design coordinates are based on the aligned SEM review tool and wafer. The program is also configured to instruct the processor to define one or more patterns of interest based on the design coordinates in the design file and the confirmed one or more defects as well as identify a pattern of interest location in the design file for each of the one or more defined patterns of interest.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include one or more layers formed upon a substrate. For example, such layers may include, but are not limited to, a resist, a dielectric material, and a conductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features. Formation and processing of such layers of material may ultimately result in completed devices. Many different types of devices such as integrated circuits (ICs) may be formed on a wafer, and the term wafer as used herein is intended to encompass a wafer on which any type of device known in the art is being fabricated. As used herein, the term "chip" may comprise a collection of ICs designed for a particular purpose.

Although embodiments are described herein with respect to wafers, it is to be understood that the embodiments may be used for another specimen such as a reticle, which may also be commonly referred to as a mask or a photomask. Many different types of reticles are known in the art, and the terms "reticle," "mask," and "photomask" as used herein are intended to encompass all types of reticles known in the art.

Detecting defects on a wafer may involve using one or more optics modes including performing a hot scan on the wafer using the one or more optics modes and one or more defect detection algorithms A "hot scan" generally refers to a scan/inspection of a wafer performed to detect defects on the wafer by applying relatively aggressive detection settings (e.g., thresholds substantially close to the noise floor). In this manner, the hot scan may be performed to collect inspection data about the wafer that will be used for the tuning process (optics selection and algorithm tuning). The goal of the hot scan is to detect a representative sample of all defect and nuisance types on the wafer in the selected mode(s).

Embodiments described herein may include multiple hot scans, for example, one hot scan for optics selection and another for parameter tuning. The hot scan performed for parameter selection may be performed using optical mode(s) that were selected for wafer inspection. Selecting the optical mode(s) may include optics selection with overall scoring, which automatically calculates a single number that specifies how "good" a mode or combination of optics modes is at finding DOI while suppressing nuisance for a given set of defects. This eliminates the work of manually comparing the signal-to-noise ratio defect by defect across many modes and significantly reduces the optics selection time.

Embodiments described herein may utilize a set of processor nodes is configured to generate an image of the wafer using the image data stored in the arrays of the storage media and at least one additional source of data for the wafer. In this manner, the set of processor nodes may be configured to perform multi-channel image fusion. The additional source(s) of data for the wafer may include any information that is available at the time of image fusion. Such data sources may include, but are not limited to, design data, a die context map generated offline using design layout, a die context map generated offline from image(s), defect detection results, defect detection results generated using image data generated by different detection channels of an inspection system, image data generated by multiple (different) scans of the wafer (e.g., multiple scans performed using different imaging modes of the inspection system), information about a reticle used to print patterns on the wafer, etc.

Image fusion may not include simply overlaying multiple sources of data (although such overlay may also be performed by the embodiments described herein). Instead, image fusion may include combining multiple sources of data to generate a composite image. Image fusion may also be performed as described in commonly owned U.S. patent application Ser. No. 12/359,476 by Chen et al, filed Jan. 26, 2009, published as U.S. Patent Application Publication No. 2010/0188657 on Jul. 29, 2010 which is incorporated by reference.

One way to identify defects using an inspection tool is to create an inspection care area. An inspection care area may be a virtual space in a design file or within one or more images. The inspection care area may indicate an area that is prone to defect. Inspection care areas may be manually created. For example, they may be manually created within software for design or inspection. The inspection care areas may be rectangular, a polygon, or any other two or three dimensional shape.

For example, a typical system on a shift device can contain thousands of scattered memory areas. It may be important to separate these areas from the random logic areas to improve inspection sensitivity and to separate the facts that may impact the memory structures. Due to the amount and distribution of the memory areas, the time that it would take for an engineer to locate them and group them into a single care area while setting up an inspection is time-consuming.

As such, an operator may use the design file in coordination with one or more inspection tools to create inspection care areas. In one example, this may be performed by programmatically analyzing the design file against certain rules. These rules may be referred to as a design rule check engine. The process of analyzing the design file may be referred to as design rule checking.

Design rule checking is an area of electronic design automation that determines whether the physical layout of a particular chip satisfies a series of recommended parameters called design rules. Design rule checking is a major step during physical verification of the design. For advanced processes, restricted rules may be utilized in order to improve yield.

Design rules may be a series of parameters provided by a semiconductor manufacturer to enable a designer to verify the correctness of a mask set. Design rules may be specific to a particular semiconductor manufacturing process. A design rule may set specific geometric and conductivity restrictions such that sufficient margins are insured and accounted for. As such, a design that follows the design rules will take into account the variability in semiconductor manufacturing processes to ensure that most of the parts work correctly.

For example design rules may include a witness rule to specify the minimum width of any shape in the design. The spacing will may specify the distance allow (minimum or maximum) between two adjacent objects. These rules may exist independently of each layer of a semiconductor manufacturing process. The lowest layers may have the smallest rules and the highest metal layers may have larger rules.

Two layer rules may specify a relationship (or a lack of relationship) that must exist between two layers. For example, an enclosure rule may specify that an object of one type, such as a contact, must be covered, with some additional margin, by metal layer.

Design rules may be specified in terms of a scalable parameter, $\lambda$, so that all geometric tolerances in a design may be defined as integer multiples of $\lambda$. This simplifies the migration of existing chip layouts to newer processes. Industrial rules may be highly optimized, and only approximate uniform scaling.

One objective of design rule checking is to achieve a high overall yield and reliability for the design. If design rules are violated the design may not be functional. To meet this goal of improving die yields, design rule checking has evolved from simple measurement and Boolean checks, to more involved rules that modify existing features, insert new features, and check the entire design for process limitations such as layer density. A completed layout consists not only of the geometric representation of the design, but also data that provides support for the manufacture of the design. While design rule checks do not validate that the design will operate correctly, they are constructed to verify that the structure meets the process constraints for a given design type and process technology.

Design rule checking software may take as input a layout in the GDSII standard format and a list of rules specific to the semiconductor process chosen for fabrication. From these the software produces a report of design rule violations that the designer may or may not choose to correct. Carefully "stretching" or waiving certain design rules is often used to increase performance and component density at the expense of yield.

Design rule checking may be a computationally intense task. Design rule checking may be run on each sub-section of the ASIC to minimize the number of errors that are detected at the top level.

Inspection care areas may also be determined, for a known pattern of interest, by using a pattern search. For example, pattern searching may include using a known design polygon pattern is a target. Pattern searching software will match the polygon and determine if an identical pattern within the target design exists.

In the semiconductor industry, there are various methods for determining the optimum lithography exposure and dose condition prequalifying specific mask levels and processes. The most common lithography learning methods are FEM (focus exposure matrix) and PWQ (process window qualification). Traditionally, FEM utilizes a few locations per die to find the best dose and focus based on critical dimension measurements. Even though this is a good initial starting point for lithography optimization, the information obtained is limited to specific predefined locations in the chip contains no information on how the pattern on the rest of the dies are affected.

In one example, a customer may want to use FEM to find one or more points of interest in a hot scan. Care areas may be generated through pattern searching.

In this example, an inspection system may report defect locations. The inspection system may use broadband plasma, for example. Broadband ultraviolet light sources are used for various applications in the semiconductor processing industry. These applications include wafer inspection systems and lithography systems. In both types of systems it is desirable for the light source to have a long useful lifetime, high brightness and a broad spectral range of emitted light. Currently plasma-based light sources are used in lithography and wafer inspection systems. Plasma-based light sources generally include an enclosure containing a cathode, an anode and a discharge gas, e.g., argon, xenon, or mercury vapor or some combination of these. A voltage between the cathode and anode maintains a plasma or electric arc.

The defect locations may be imported into a pattern search and run without a manual check of any potential wafer/design shift. If there are too many detected defects, the customer cannot check if the defect locations are correct in the design file. For example, there may be up to 1 million defects in an initial hot scan, which then requires sampling and review the real defects. Real defects may number in the several thousands. As such, there are limited ways to manual correction without spending weeks of human labor on the process.

Figure 1:
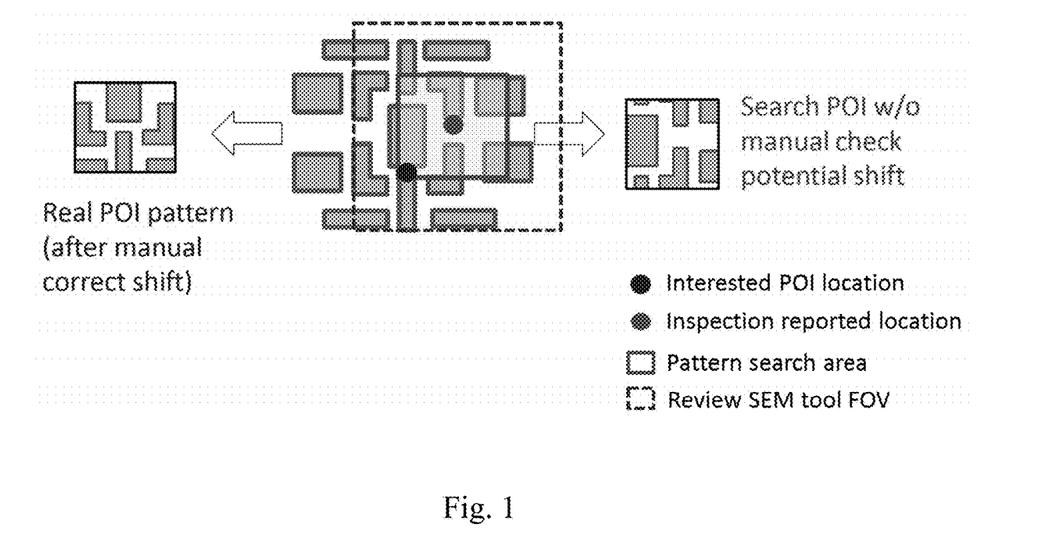
FIG. 1 is an illustration showing the shift between an inspection reported pattern of interest and a real pattern of interest.
Figure 2:
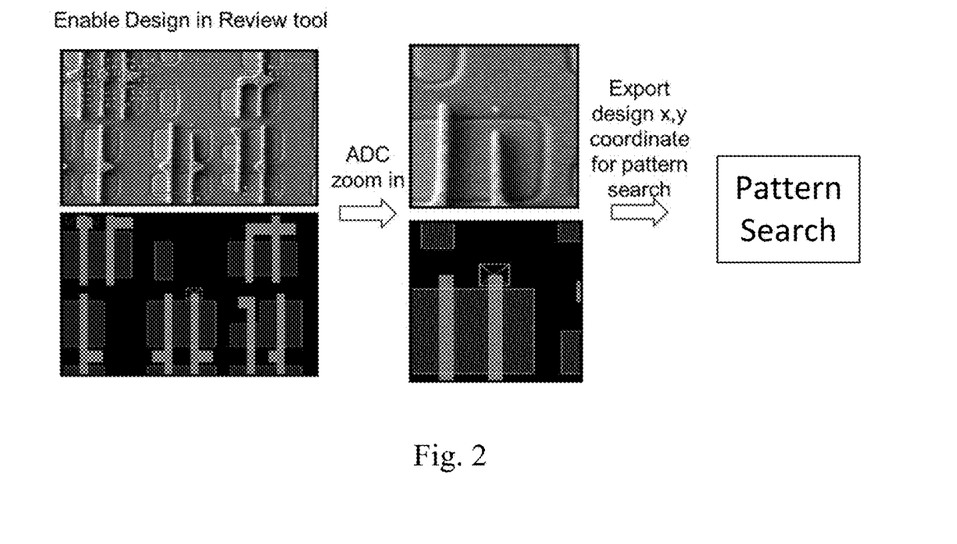
FIG. 2 is an illustration of one embodiment of the present disclosure comparing the design file with SEM images and exporting the design coordinates as a basis of a pattern search.

FIG. 1 illustrates how a pattern search result could be shifted away from an actual pattern of interest. As shown in FIG. 1, the interested pattern of interest location as detected by the inspection system may be transposed with the actual pattern of interest in the design file. In one embodiment, the inspection system is a SEM tool having a field-of-view that includes the pattern of interest. However, when the inspection tool reports the location of a pattern of interest, the location is centered in the SEM tool's field of view. The center of the SEM tool's FOV may not directly correspond to the interested pattern of interest. Therefore, a shift correction must be performed to match the design coordinates to the inspection tool's reported coordinates.

Shift correction may be necessary because, for example, the broadband plasma reported defect locations may be merged with incomplete or inaccurate pixels. The pixels may be incomplete or inaccurate because of the type of scan (such as a hot scan) performed on the wafer. The incomplete or inaccurate pixels may be merged, thus introducing a small shift to real defect location in comparison to the reported location by the inspection tool. For example, some broadband plasma tools have an intrinsic defect location accuracy of approximately 300 nm.

This accuracy may be insufficient and cause shifting in smaller sized designs.

Discrepancies between design file coordinates and the inspection tool coordinates can lead to wasted or incorrect hot spot searching because the inspection tool is imaging in the wrong areas due to the shift.

One embodiment of the present disclosure corrects for this coordinate shift by enabling a SEM-to-design feature in a defect review tool. For example, a SEM-to-design feature may collect and/or match SEM images and nearby design polygons automatically.

SEM images are reviewed in an automatic defect classification mode on the SEM review tool. The automatic defect classification mode ensures that defects will be in the center of the inspection tool's field of view. Automatic defect classification is based on attributes of the SEM/inspection tools to create rules to perform the automatic defect classification. During SEM review procedures, the SEM review tool will take two or more images on a target location and also on the same location on a reference die. The images from the reference die may be stored in memory and retrieved for this purpose. Software will compare the differences between these images in order to locate where the defect is within the SEM image. The SEM tool will center that location and take a magnified picture. As such, the defect (or potential defect) will be at the center of the final SEM image. This kind of procedure is also called automatic defect centering.

After confirming the defects are real, a coordinate file may be exported containing coordinates of the defects in the design space. For example, the coordinate file may be a CSV file with x,y coordinates in design space. Defect confirmation may be performed manually or performed automatically using automatic defect classification.

The coordinate file may be imported into the inspection system to be used as a search source location for a pattern search. After SEM imaging, the system will have information regarding coordinates of each defect in the design coordinate system. This is different than in previous applications where coordinates were based on data from the inspection tool. The recorded information is used by pattern searching software in order to make a target pattern. The pattern searching software may be standalone software and external from the inspection system.

In one embodiment an image of a reticle generated by a reticle inspection system is used as image data in the image data space. In this manner an image or a reticle generated by a reticle inspection system may be used as a substitute for image data. The image of the reticle used in this embodiment may include any suitable image of the reticle generated in any suitable manner by any reticle inspection system known in the art. For example the image of the reticle may be a high magnification optical or electron beam image of the reticle acquired by a high magnification optical reticle inspection system or an electron beam based reticle inspection system respectively. Alternatively the image of the reticle may be an aerial image of the reticle acquired by an aerial imaging reticle inspection system.

In one embodiment, an inspection system is used to collect image data. For example, the optical and electron beam output acquisition subsystems described herein may be configured as inspection systems. In another embodiment, the image data acquisition subsystem is a defect review system. For example, the optical and electron beam output acquisition subsystems described herein may be configured as defect review systems. In a further embodiment, the image data acquisition subsystem is a metrology system. For example, the optical and electron beam output acquisition subsystems described herein may be configured as metrology systems. In particular, the embodiments of the output acquisition subsystems described herein and shown in FIG. 3 may be modified in one or more parameters to provide different imaging capability depending on the application for which they will be used. In one such example, the image data acquisition subsystem shown in FIG. 3 may be configured to have a higher resolution if it is to be used for defect review or metrology rather than for inspection. In other words, the embodiments of the image data acquisition subsystem shown in FIG. 3 describe some general and various configurations for an image data acquisition subsystem that can be tailored in a number of manners that will be obvious to one skilled in the art to produce output acquisition subsystems having different imaging capabilities that are more or less suitable for different applications.

The systems and methods of the present disclosure may utilize output acquisition subsystems, defect review output acquisition subsystems, and metrology image data acquisition subsystems that are configured for inspection, defect review, and metrology of specimens such as wafers and reticles. For example, the embodiments described herein may be configured for using both scanning electron microscopy (SEM) and optical images for the purposes of mask inspection, wafer inspection, and wafer metrology. In particular, the embodiments described herein may be installed on a computer node or computer cluster that is a component of or coupled to an image data acquisition subsystem such as a broadband plasma inspector, an electron beam inspector or defect review tool, a mask inspector, a virtual inspector, etc. In this manner, the embodiments described herein may generate output that can be used for a variety of applications that include, but are not limited to, wafer inspection, mask inspection, electron beam inspection and review, metrology, etc. The characteristics of the output acquisition subsystems shown in FIG. 3 can be modified as described above based on the specimen for which it will generate actual output.

Such a subsystem includes an image data acquisition subsystem that includes at least an energy source and a detector. The energy source is configured to generate energy that is directed to a wafer. The detector is configured to detect energy from the wafer and to generate output responsive to the detected energy.

Figure 3:
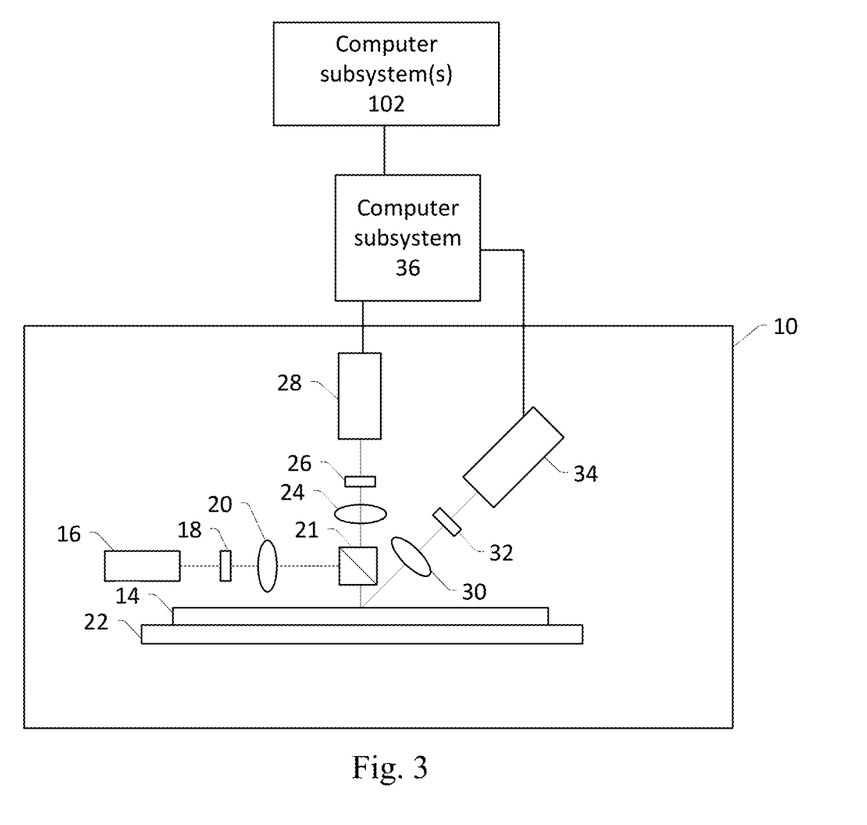
FIG. 3 is a diagram of an inspection system for collecting an image.

In one embodiment, the energy directed to the wafer includes light, and the energy detected from the wafer includes light. For example, in the embodiment of the system shown in FIG. 3, image data acquisition subsystem 10 includes an illumination subsystem configured to direct light to wafer 14. The illumination subsystem includes at least one light source. For example, as shown in FIG. 3, the illumination subsystem includes light source 16. In one embodiment, the illumination subsystem is configured to direct the light to the wafer at one or more angles of incidence, which may include one or more oblique angles and/or one or more normal angles. For example, as shown in FIG. 3, light from light source 16 is directed through optical element 18 and then lens 20 to beam splitter 21, which directs the light to wafer 14 at a normal angle of incidence. The angle of incidence may include any suitable angle of incidence, which may vary depending on, for instance, characteristics of the wafer.

The illumination subsystem may be configured to direct the light to the wafer at different angles of incidence at different times. For example, the image data acquisition subsystem may be configured to alter one or more characteristics of one or more elements of the illumination subsystem such that the light can be directed to the wafer at an angle of incidence that is different than that shown in FIG. 3. In one such example, the image data acquisition subsystem may be configured to move light source 16, optical element 18, and lens 20 such that the light is directed to the wafer at a different angle of incidence.

In some instances, the image data acquisition subsystem may be configured to direct light to the wafer at more than one angle of incidence at the same time. For example, the illumination subsystem may include more than one illumination channel, one of the illumination channels may include light source 16, optical element 18, and lens 20 as shown in FIG. 3 and another of the illumination channels (not shown) may include similar elements, which may be configured differently or the same, or may include at least a light source and possibly one or more other components such as those described further herein. If such light is directed to the wafer at the same time as the other light, one or more characteristics (e.g., wavelength, polarization, etc.) of the light directed to the wafer at different angles of incidence may be different such that light resulting from illumination of the wafer at the different angles of incidence can be discriminated from each other at the detector(s).

In another instance, the illumination subsystem may include only one light source (e.g., source 16 shown in FIG. 3) and light from the light source may be separated into different optical paths (e.g., based on wavelength, polarization, etc.) by one or more optical elements (not shown) of the illumination subsystem. Light in each of the different optical paths may then be directed to the wafer. Multiple illumination channels may be configured to direct light to the wafer at the same time or at different times (e.g., when different illumination channels are used to sequentially illuminate the wafer). In another instance, the same illumination channel may be configured to direct light to the wafer with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the wafer at different times. The illumination subsystem may have any other suitable configuration known in the art for directing the light having different or the same characteristics to the wafer at different or the same angles of incidence sequentially or simultaneously.

In one embodiment, light source 16 may include a broadband plasma (BBP) light source. In this manner, the light generated by the light source and directed to the wafer may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 3 as a single refractive optical element, it is to be understood that, in practice, lens 20 may include a number of refractive and/or reflective optical elements that in combination focus the light from the optical element to the wafer. The illumination subsystem shown in FIG. 3 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for output acquisition.

The image data acquisition subsystem may also include a scanning subsystem configured to cause the light to be scanned over the wafer. For example, the image data acquisition subsystem may include stage 22 on which wafer 14 is disposed during output acquisition. The scanning subsystem may include any suitable mechanical and/or robotic assembly (that includes stage 22) that can be configured to move the wafer such that the light can be scanned over the wafer. In addition, or alternatively, the image data acquisition subsystem may be configured such that one or more optical elements of the image data acquisition subsystem perform some scanning of the light over the wafer. The light may be scanned over the wafer in any suitable fashion.

The image data acquisition subsystem further includes one or more detection channels. At least one of the one or more detection channels includes a detector configured to detect light from the wafer due to illumination of the wafer by the image data acquisition subsystem and to generate output responsive to the detected light. For example, the image data acquisition subsystem shown in FIG. 3 includes two detection channels, one formed by collector 24, element 26, and detector 28 and another formed by collector 30, element 32, and detector 34.

As shown in FIG. 3, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the wafer. However, two or more of the detection channels may be configured to detect the same type of light from the wafer (e.g., specularly reflected light). Although FIG. 3 shows an embodiment of the image data acquisition subsystem that includes two detection channels, the image data acquisition subsystem may include a different number of detection channels (e.g., only one detection channel or two or more detection channels). Although each of the collectors are shown in FIG. 3 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the image data acquisition subsystem may be signals or data, but not image signals or image data. In such instances, a computer subsystem such as computer subsystem 36 of the system may be configured to generate images of the wafer from the non-imaging output of the detectors. However, in other instances, the detectors may be configured as imaging detectors that are configured to generate imaging signals or image data. Therefore, the system may be configured to generate the images described herein in a number of ways.

It is noted that FIG. 3 is provided herein to generally illustrate a configuration of an image data acquisition subsystem that may be included in the system embodiments described herein. Obviously, the image data acquisition subsystem configuration described herein may be altered to optimize the performance of the system as is normally performed when designing a commercial system. In addition, the systems described herein may be implemented using an existing output acquisition system (e.g., by adding functionality described herein to an existing output acquisition system) such as tools that are commercially available from KLA-Tencor. For some such systems, the methods described herein may be provided as optional functionality of the output acquisition system (e.g., in addition to other functionality of the output acquisition system). Alternatively, the system described herein may be designed "from scratch" to provide a completely new system.

Computer subsystem 36 of the system may be coupled to the detectors of the image data acquisition subsystem in any suitable manner (e.g., via one or more transmission media, which may include "wired" and/or "wireless" transmission media) such that the computer subsystem can receive the output generated by the detectors during scanning of the wafer. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 by any suitable transmission media, which may include any suitable wired and/or wireless transmission media known in the art. Two or more of such computer subsystems may also be effectively coupled by a shared computer-readable storage medium (not shown).

Figure 4:
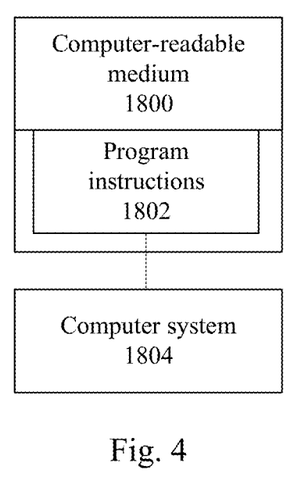
FIG. 4 is a diagram showing a non-transitory computer-readable medium storing program instructions executable on a computer system for performing a computer-implemented method of the present disclosure.

An additional embodiment relates to a non-transitory computer-readable medium storing program instructions executable on a computer system for performing a computer-implemented method for mode selection and image fusion. One such embodiment is shown in FIG. 4. In particular, as shown in FIG. 4, non-transitory computer-readable medium 1800 includes program instructions 1802 executable on computer system 1804. The computer-implemented method may include any step(s) of any method(s) described herein.

Program instructions 1802 implementing methods such as those described herein may be stored on computer-readable medium 1800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 1804 may be configured according to any of the embodiments described herein.

Figure 5:
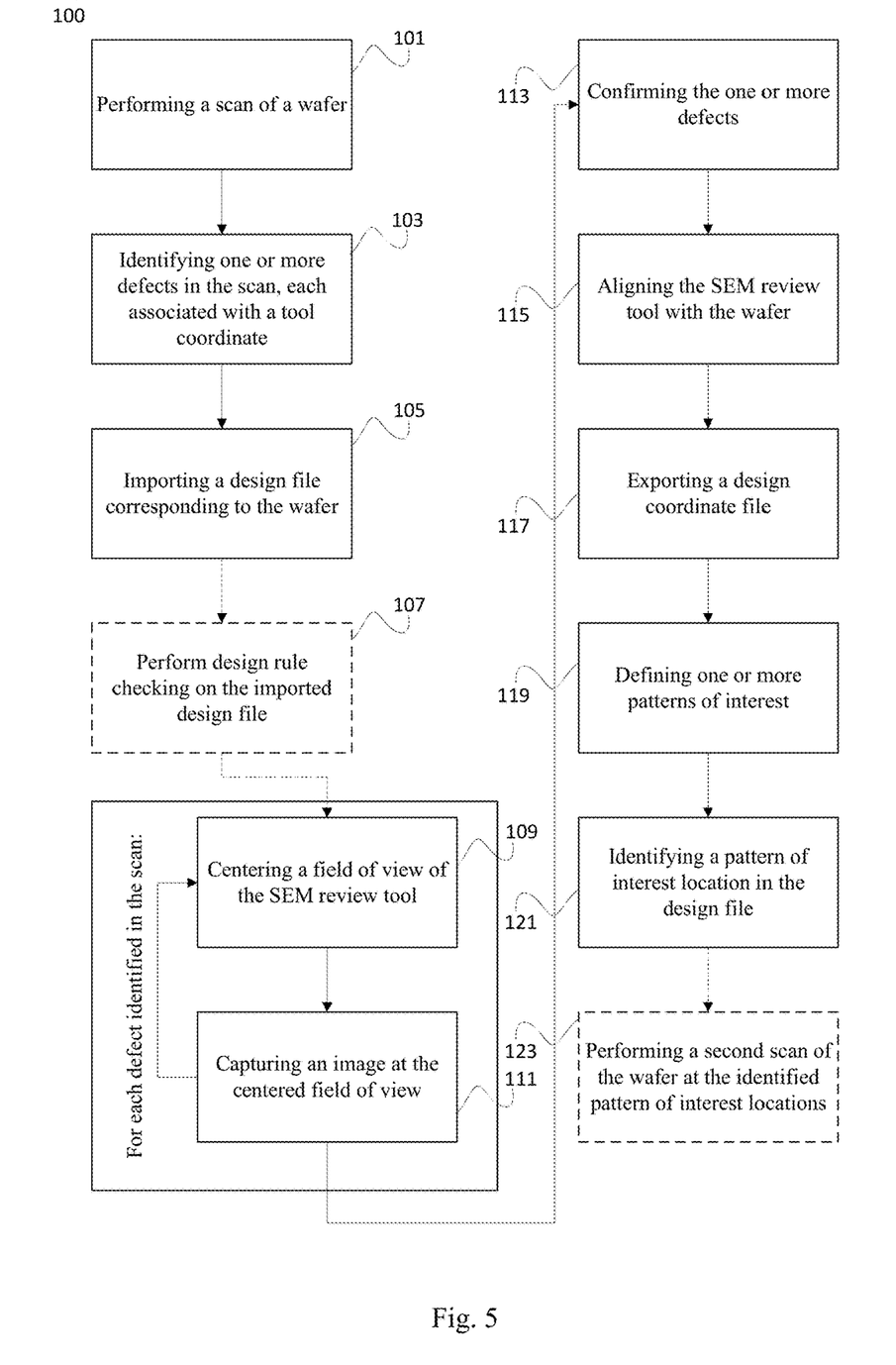
FIG. 5 is a flowchart showing a method according to one or more embodiments of the present disclosure.

FIG. 5 illustrates one or more methods of the present disclosure. A method 100 for identifying a pattern of interest locations in a design file is disclosed. Using an image data acquisition subsystem, a scan of a wafer is performed 101. The image data acquisition subsystem may be a broadband plasma image data acquisition subsystem or any other device that is capable of scanning a wafer with sufficient resolution.

The method 100 further comprises identifying 103 one or more defects in the scan of the wafer. The image data acquisition subsystem may perform the identification 103. The identification 103 may be performed by other equipment, such as a remote server, the SEM review tool, or a processor. Each identified 103 defect is associated with a tool coordinate. The tool coordinate may be an X, Y coordinate in the tool coordinate system. The tool coordinate system may be the positioning system for the image data acquisition subsystem. For example, the tool coordinate system may be associated with the location of the image data acquisition subsystem over a wafer.

The method 100 further comprises importing 105 a design file corresponding to the wafer. For example, the design file may be imported 105 by downloading the design file to local memory. The design file may have one or more design polygons. The design file may be imported 105 using a processor in electronic communication with a SEM review tool. For example, the processor may direct the design file to the SEM review tool. In another example, the processor may instruct the SEM review tool to download the design file.

For each defect identified in the scan of the wafer, the method 100 further comprises centering 109 and capturing 111. Using the processor, a field of view of the SEM review tool is centered 109 at the tool coordinate associated with the defect. For example, the processor may instruct the SEM review tool to review a location on the wafer based on tool coordinate associated with that defect. The SEM review tool captures 111 an image at the centered field of view. This may be done in order to capture area near the defect as well as the defect itself. The captured 111 the image may be stored at the SEM review tool, a centralized server, or sent directly to the processor.

Using the SEM review tool, the method 100 further comprises confirming 113 the one or more defects in the scan based on the captured 111 images. The SEM review tool may use automatic defect classification in order to determine whether the defects are nuisance or actual defects. Images related to nuisance defects may be discarded Images related to confirmed 113 defects may be saved at the SEM review tool, a centralized database, or sent to the processor.

The method 100 further comprises aligning 115 the SEM review tool with the wafer based on the one or more design polygons in the design file. The SEM review tool may be aligned 115 physically or through mathematical transposition. For example, a transposition matrix may be used to align 115 the SEM review tool with the wafer based on the design polygons.

The method 100 further comprises exporting 117 a design coordinate file. The design coordinate file may be exported 117 from the SEM review tool. The design coordinate file may have design coordinates associated with each of the confirmed 113 defects. The design coordinates may be based on the aligned 115 SEM review tool and wafer. The design coordinates may be X, Y coordinates in the design coordinate system. Other types of coordinates may be used. One example, a Z coordinate may be included.

The method 100 further comprises defining 119 one or more patterns of interest based on the design coordinates in the design file and the confirmed one or more defects. For example, the processor may define 119 a pattern of interest where multiple defects have occurred on the wafer corresponding to the design file.

The method 100 further comprises identifying 121 a pattern of interest location in the design file for each of the one or more defined patterns of interest. The identified 121 pattern or patterns of interest may be polygonal in shape. Other shapes, such as rectangles, squares, and ovals may be valid identified 121 pattern of interest locations. As used herein, the pattern of interest location may refer to a single point or an area of the design file or wafer.

In one embodiment, method 100 further comprises performing 107 design rule checking on the imported design file. For example, the SEM review tool or processor may perform 107 analysis of the design based on known factors of failure in a particular design layout.

In another embodiment, the method 100 further comprises performing 123 a second scan of the wafer at the identified pattern of interest locations. For example, after a pattern of interest is identified 121, it may be advantageous to perform a high-resolution scan on that area of the wafer to determine the severity or presence of the defect.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method for identifying pattern of interest locations in a design file, comprising:
    performing, using an image data acquisition subsystem, a scan of a wafer;
    identifying, using the image data acquisition subsystem, one or more defects in the scan of the wafer, each defect associated with a tool coordinate of a location of the image data acquisition subsystem relative to the wafer;
    importing, using a processor in electronic communication with a scanning electron microscopy (SEM) review tool, a design file corresponding to the wafer, the design file having one or more design polygons and a pattern search area;
    for each defect identified in the scan of the wafer:
        centering, using the processor, a field of view of the SEM review tool at the tool coordinate associated with the defect; and
        capturing, using the SEM review tool, an image at the centered field of view;
    confirming, using the SEM review tool, the one or more defects in the scan based on the captured images;
    aligning, using the processor, the SEM review tool with the wafer based on the one or more design polygons in the design file;
    exporting, from the SEM review tool, a design coordinate file having design coordinates associated with each of the confirmed defects, the design coordinates based on the aligned SEM review tool and the wafer;
    defining one or more patterns of interest, using the processor, based on the design coordinates in the design coordinate file and the confirmed one or more defects; and
    identifying, using the processor, a pattern of interest location in the design file for each of the one or more defined patterns of interest.

2. The method of claim 1, wherein the image data acquisition subsystem is a broadband plasma image data acquisition subsystem.

3. The method of claim 1, further comprising performing, using the image data acquisition subsystem, a second scan of the wafer at the identified pattern of interest locations.

4. The method of claim 1, further comprising the step of performing, using the processor, design rule checking on the imported design file.

5. The method of claim 1, wherein the field of view of the SEM review tool is at least 300 nm.

6. The method of claim 1, wherein the design coordinate file is a CSV file.

7. The method of claim 1, wherein the one or more defects in the scan are confirmed using automatic defect classification thereby excluding nuisance.

8. A system for identifying pattern of interest locations in a design file comprising:
    an image data acquisition subsystem;
    a SEM review tool having a field of view; and
    a processor in electronic communication with the image data acquisition subsystem and the SEM review tool, the processor configured to:
        instruct the image data acquisition subsystem to perform a scan of a wafer;
        identify one or more defects present in the scan, each defect associated with a tool coordinate of a location of the image data acquisition subsystem relative to the wafer;
        import a design file corresponding to the wafer, the design file having one or more design polygons and a pattern search area;
        for each defect identified in the scan of the wafer:
            instruct the SEM review tool to center the field of view of the SEM review tool at the tool coordinate associated with the defect; and
            instruct the SEM review tool to capture an image at the centered field of view;
        instruct the SEM review tool to confirm the one or more defects in the scan based on the captured images;
        align the SEM review tool with the wafer based on the one or more design polygons in the design file;
        export, from the SEM review tool, a design coordinate file having design coordinates associated with each of the confirmed defects, the design coordinates based on the aligned SEM review tool and the wafer;
        define one or more patterns of interest based on the design coordinates in the design coordinate file and the confirmed one or more defects; and
        identify a pattern of interest location in the design file for each of the one or more defined patterns of interest.

9. The system of claim 8, wherein the image data acquisition subsystem is a broadband plasma image data acquisition subsystem.

10. The system of claim 8, wherein the processor is further configured to instruct the image data acquisition subsystem to perform a second scan of the wafer at the identified pattern of interest locations.

11. The system of claim 8, wherein the processor is further configured to perform design rule checking on the imported design file.

12. The system of claim 8, wherein the field of view of the SEM review tool is at least 300 nm.

13. The system of claim 8, wherein the design coordinate file is a CSV file.

14. The system of claim 8, wherein the processor is further configured to perform automatic defect classification thereby excluding nuisance.

15. A non-transitory computer readable medium storing a program configured to instruct a processor to:
    perform, using an image data acquisition subsystem, a scan of a wafer;
    identify, using the image data acquisition subsystem, one or more defects in the scan of the wafer, each defect associated with a tool coordinate of a location of the image data acquisition subsystem relative to the wafer;
    import, using a processor in electronic communication with a SEM review tool, a design file corresponding to the wafer, the design file having one or more design polygons and a pattern search area;

for each defect identified in the scan of the wafer:
  center, using the processor, a field of view of the SEM review tool at the tool coordinate associated with the defect; and
  capture, using the SEM review tool, an image at the centered field of view;
confirm, using the SEM review tool, the one or more defects in the scan based on the captured images;
align, using the processor, the SEM review tool with the wafer based on the one or more design polygons in the design file;
export, from the SEM review tool, a design coordinate file having design coordinates associated with each of the confirmed defects, the design coordinates based on the aligned SEM review tool and the wafer;
define one or more patterns of interest, using the processor, based on the design coordinates in the design coordinate file and the confirmed one or more defects; and
identify, using the processor, a pattern of interest location in the design file for each of the one or more defined patterns of interest.

16. The method of claim 1, wherein the one or more patterns of interest are defined where multiple defects occurred on the wafer corresponding to the design file.

17. The method of claim 3, wherein the second scan is performed at a higher resolution than the scan of a wafer.

* * * * *